United States Patent [19]

Kunikane et al.

[11] Patent Number: 5,479,547
[45] Date of Patent: Dec. 26, 1995

[54] OPTICAL MULTIPLEXER AND DEMULTIPLEXER MODULE INCLUDING MULTIPLEXING AND DEMULTIPLEXING FILTER FILM

[75] Inventors: Tatsuro Kunikane; Tetsuo Watanabe; Sadayuki Miyata, all of Kawasaki; Hiroyuki Furukawa; Yoshimitsu Sakai, both of Sapporo, all of Japan

[73] Assignee: Fujitsu Limited, Kawasaki, Japan

[21] Appl. No.: 322,569

[22] Filed: Oct. 13, 1994

[30] Foreign Application Priority Data

Mar. 18, 1994 [JP] Japan .................................. 6-048707

[51] Int. Cl.$^6$ ........................................ G02B 6/28
[52] U.S. Cl. ...................... 385/47; 385/14; 385/16; 385/24; 385/49; 359/127
[58] Field of Search .............................. 385/14, 15, 16, 385/17, 23, 24, 28, 31, 39, 42, 47, 50, 73, 49, 130; 359/127, 124, 128

[56] References Cited

U.S. PATENT DOCUMENTS

| | | | |
|---|---|---|---|
| 4,693,544 | 9/1987 | Yamasaki et al. | 385/24 |
| 4,726,012 | 2/1988 | Amadieu et al. | 385/24 |
| 4,789,214 | 12/1988 | Vilhelmsson et al. | 385/14 |
| 4,813,756 | 3/1989 | Frenkel et al. | 385/73 |
| 5,031,984 | 7/1991 | Eide et al. | 385/15 |
| 5,098,804 | 3/1992 | Booth | 385/16 |
| 5,790,615 | 12/1988 | Seki et al. | 385/14 |

*Primary Examiner*—Akm E. Ullah
*Assistant Examiner*—Hemang Sanghavi
*Attorney, Agent, or Firm*—Armstrong, Westerman, Hattori, McLeland & Naughton

[57] ABSTRACT

A compact size optical multiplexer and demultiplexer module. The optical multiplexer and demultiplexer module includes a multiplexing and demultiplexing film disposed on an end surface of a waveguide substrate, having an optical waveguide formed thereon, on which surface an input and output end of the optical waveguide appears. The multiplexing and demultiplexing film transmits a light beam of wavelength $\lambda_1$ and reflects a light beam of wavelength $\lambda_2$. A first optical fiber is disposed such that a light beam with the wavelength $\lambda_1$ propagated therethrough is coupled to the input and output end of the waveguide substrate after being transmitted through the multiplexing and demultiplexing film and the second optical fiber is disposed such that a light beam with the wavelength $\lambda_2$ propagated therethrough is coupled to the first optical fiber after being reflected by the multiplexing and demultiplexing film. A light beam with the wavelength $\lambda_1$ from the first optical fiber is transmitted through the multiplexing and demultiplexing film and sent to a photodiode and a light beam with the wavelength $\lambda_1$ from a laser diode is transmitted through the multiplexing and demultiplexing film and sent to the first optical fiber. A light beam with the wavelength $\lambda_2$ from the second optical fiber is reflected by the multiplexing and demultiplexing film and sent to the first optical fiber.

13 Claims, 13 Drawing Sheets

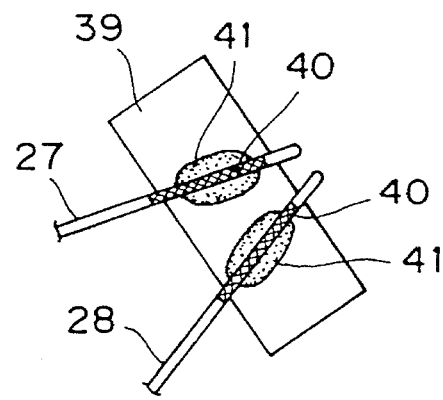
F I G. II (a)
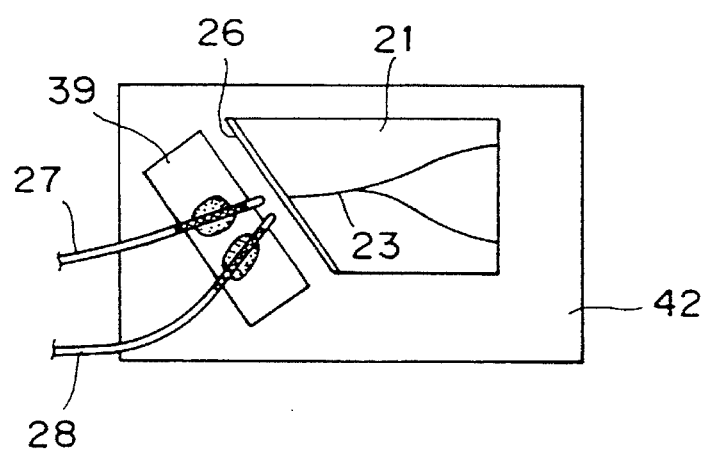
F I G. II (b)
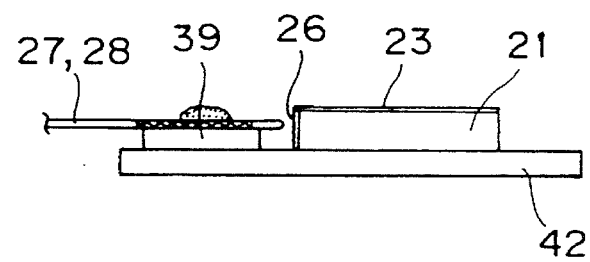
F I G. II (c)

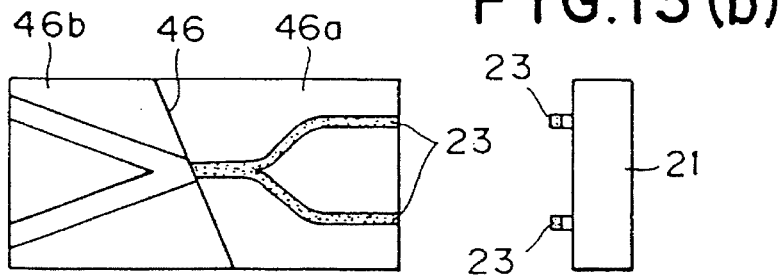
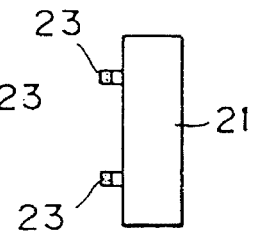
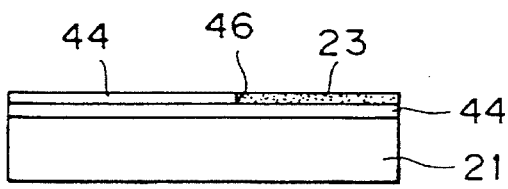
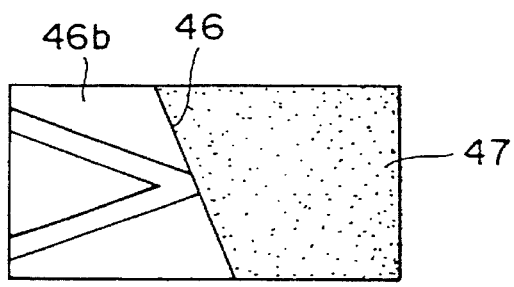
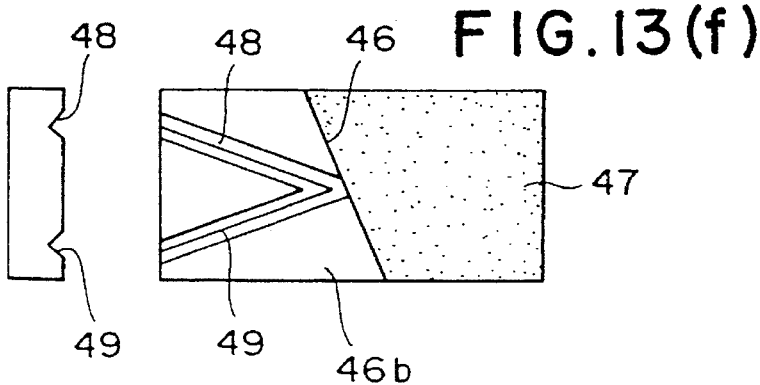

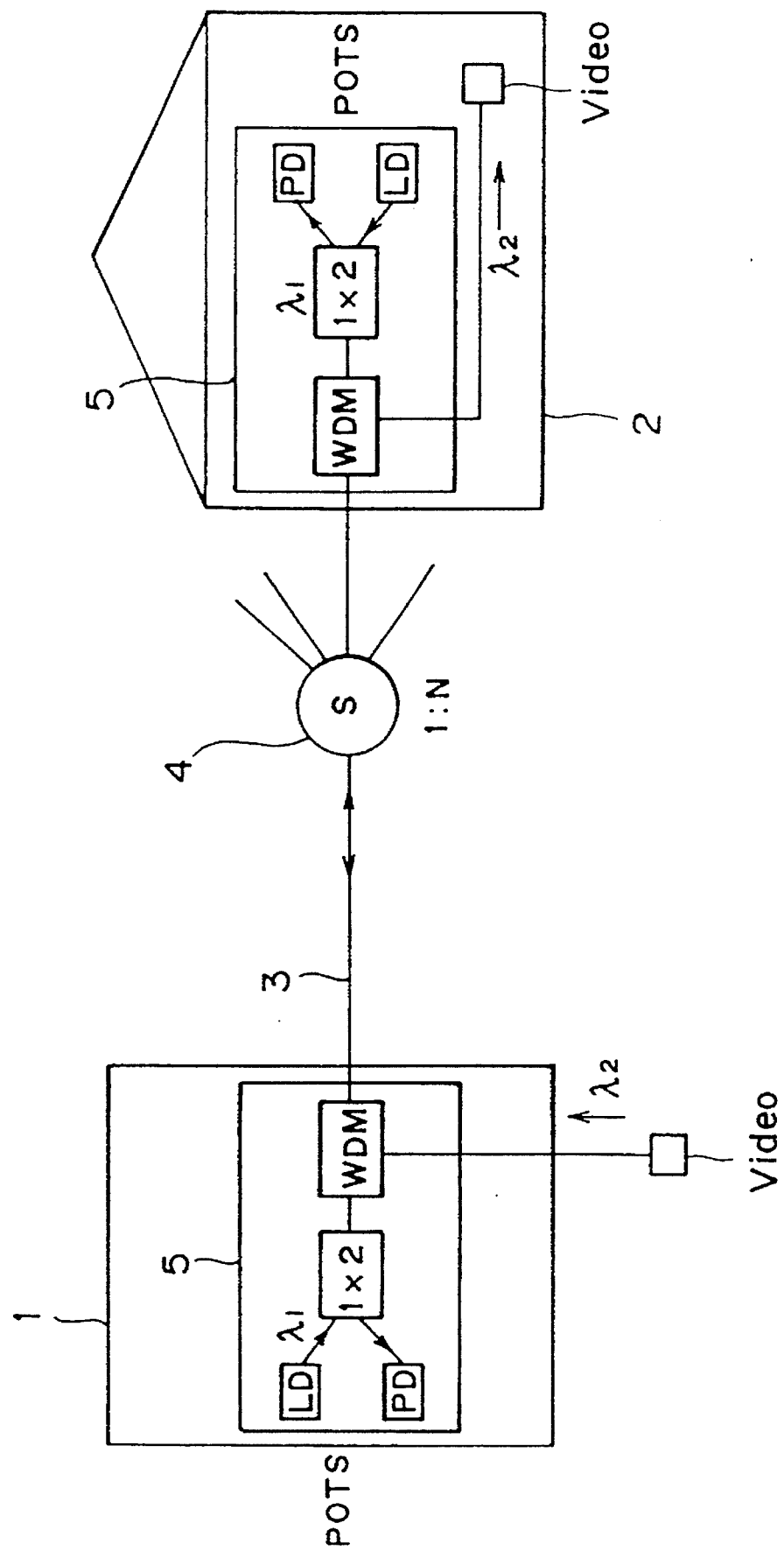

OPTICAL MULTIPLEXER AND DEMULTIPLEXER MODULE INCLUDING MULTIPLEXING AND DEMULTIPLEXING FILTER FILM

BACKGROUND OF THE INVENTION

1. Field of the Invention

The present invention relates to an optical multiplexer and demultiplexer module.

2. Description of the Related Art

Recently, optical systems such as optical subscriber systems nave made rapid progress and there are great demands for large scale integration and cost reduction of optical transmitter and receiver units for use in such systems. Accordingly, it is also needed to attain miniaturization and cost reduction of the optical multiplexer and demultiplexer module as a component of the optical transmitter and receiver unit and the like.

Referring first to FIG. 15, a general optical subscriber system will be described.

The optical subscriber system is a system offering low-speed communication service such as POTS service (telephone service and the like) and high-speed communication service such as transmission of video signals. Referring to FIG. 15, reference numeral 1 denotes a central office (a station or the like) and 2 denotes a home (subscriber's house or equipment). A plurality of homes 2 are each connected to an optical fiber transmission cable 3 from the central office 1 by way of a 1:N star coupler 4. The central office 1 and the home 2 each have an optical transmitter and receiver unit 5 installed therein. The optical transmitter and receiver unit 5 comprises, as shown in detail in FIG. 16, a laser diode (LD) 6, a photodiode (PD) 7, a first optical coupler (1×2 optical coupler), a second optical coupler (WDM: Wavelength Demultiplexer coupler) 9, and the like.

The laser diode 6 transmitting an optical signal of wavelength $\lambda 1 = 1.31$ μm and the photodiode 7 receiving an optical signal equally of $\lambda 1 = 1.31$ μm are coupled, through the first optical coupler 8 and the second optical coupler 9, with a first optical fiber 11, which is connected with the optical fiber transmission cable 3 by a connector 10, and, thereby, low-speed communication service such as telephone service is offered. A second optical fiber 12 over which an optical signal of wavelength $\lambda_2 = 1.55$ μm is transmitted is coupled, through the second optical coupler 9, with the optical fiber 11, which is connected with the optical fiber transmission cable 3 by the connector 10, and, thereby, high-speed communication service such as video service is offered. The second optical fiber 12 is connected to a video signal generator, reproducer, or the like by a connector 13.

A conventional waveguide-type optical multiplexer and demultiplexer module, having optical couplers 8 and 9 and the like, used in the optical transmitter and receiver unit 5 is structured as shown in FIG. 17. Parts in FIG. 17 substantially the same as those in FIG. 16 are denoted by corresponding reference numerals and therefore description of the same will be partly omitted. Referring to FIG. 17, reference numeral 14 denotes a waveguide substrate and, on the waveguide substrate 14, there are formed optical couplers 8 and 9 by connecting a plurality of optical waveguides 15. Front end portions of the first optical fiber 11 and the second optical fiber 12 are connected to an end surface of the waveguide substrate 14 and, thereby, their cores are coupled to the optical waveguide 15.

An optical signal from the first optical fiber 11 of wavelength $\lambda 1$ is input to the optical waveguide 15 and sent to the photodiode 7 through the optical coupler 9 and the optical coupler 8, while an optical signal from the laser diode 6 of wavelength $\lambda 1$ is input to the optical waveguide 15 and sent to the optical fiber 11 through the optical coupler 8 and the optical coupler 9. On the other hand, an optical signal from the second optical fiber 12 of wavelength $\lambda 2$ is sent to the optical fiber 11 through the optical waveguide 15. In reverse, an optical signal from the first optical fiber 11 of wavelength $\lambda 2$ is sent to the optical waveguide 12 through the optical waveguide 15.

Optical systems such as the optical subscriber systems have recently made rapid progress and there are great demands for large scale integration and cost reduction of optical transmitter and receiver units for use in such systems. Accordingly, it is needed also to miniaturize the optical multiplexer and demultiplexer module as a component of the optical transmitter and receiver unit and the like. However, there has been a problem with the conventional art that there are limits to miniaturization of the optical multiplexer and demultiplexer module. More specifically, it is desirable that the first optical fiber and the second optical fiber are arranged on one side of the waveguide substrate in view of mountability of the waveguide type optical multiplexer and demultiplexer module. To attain this, it has hitherto been practiced to form a U-shaped bend portion in the optical waveguide 15, as indicated by numeral 16 in FIG. 17. In order to decrease light power loss, however, the radius of curvature of the bend portion 16 cannot be decreased. Accordingly, the waveguide substrate 14 becomes larger and, thereby, miniaturization of the waveguide type optical multiplexer and demultiplexer module has been impeded.

SUMMARY OF THE INVENTION

Accordingly, an object of the present invention is to attain miniaturization of a waveguide type optical multiplexer and demultiplexer module and attain high packaging density in and cost reduction of an optical transmitter and receiver unit or the like which is formed with the module.

In accordance with an aspect of the present invention, there is provided an optical multiplexer and demultiplexer module comprising a waveguide substrate on which a waveguide is formed, a multiplexing and demultiplexing filter film provided on an end surface of the waveguide substrate, on which surface an input and output end of the optical waveguide appears, for transmitting a first wavelength and reflecting a second wavelength, a first optical fiber arranged such that a light beam with the first wavelength propagated therethrough is coupled to the optical waveguide on the waveguide substrate after being transmitted through the multiplexing and demultiplexing filter film, and a second optical fiber arranged such that a light beam with the second wavelength propagated therethrough is coupled to the first optical fiber after being reflected by the multiplexing and demultiplexing filter film.

It is preferred that the end surface of the waveguide substrate on which the multiplexing and demultiplexing filter film is formed is oriented such that the normal line to the end surface forms an angle of θ0 with the optical waveguide, the first optical fiber, and the second optical fiber are arranged on both sides of the normal line to the end face, each forming an angle of θ1 with the normal line, and the angle θ0 and the angle θ1 are set so as to substantially satisfy the relationship $\sin\theta_1 = n \cdot \sin\theta_0$, where n is the refractive index of the optical waveguide.

A first lens is disposed between the first optical fiber and optical multiplexing and demultiplexing filter film and a second lens is disposed between the second optical fiber and the optical multiplexing and demultiplexing filter film. The first optical fiber is disposed such that its center axis is offset from the center axis of the first lens so that the first fiber is coupled to the optical waveguide through the first lens, and the second optical fiber is disposed such that its center axis is offset from the center axis of the second lens so that the second optical fiber is coupled to the first optical fiber through the second lens, whereby the first optical fiber and the second optical fiber can be arranged substantially parallel to each other.

The optical multiplexer and demultiplexer module of the invention is also structured by comprising a waveguide substrate, on which an optical waveguide is formed, having a slit formed therein such that the input and output end of the optical waveguide appears on a surface of the slit and having a first V groove and a second V groove formed therein so as to form predetermined angles with the slit, a multiplexing and demultiplexing filter film provided on the surface of the slit formed in the waveguide substrate, on which surface the optical waveguide appears, for transmitting a first wavelength and reflecting a second wavelength, a first optical fiber arranged along and fixed to the first V groove such that a light beam with the first wavelength propagated therethrough is coupled to the optical waveguide on the waveguide substrate after being transmitted through the multiplexing and demultiplexing filter film, and a second optical fiber arranged along and fixed to the second V groove such that a light beam with the second wavelength propagated therethrough is coupled to the first optical fiber after being reflected by the multiplexing and demultiplexing filter film.

According to the invention, the first and second optical fibers are arranged to be coupled to each other by means of the optical multiplexing and demultiplexing filter film. Therefore, the need for forming a U-shaped bend portion on the waveguide substrate hitherto practiced can be eliminated. Accordingly, the waveguide substrate can be made smaller and, hence, the optical multiplexer and demultiplexer module can be made smaller. Further, by disposing the first and second optical fibers so as to satisfy the above mentioned relational expression, coupling producing small power loss can be obtained.

Further, when such a configuration is adopted in which the center axes of the first and the second optical fibers are offset from the center axes of the first and second lenses, respectively, the first and the second optical fiber can be arranged virtually parallel to each other and, hence an optical multiplexer and , demultiplexer module providing good mountability on a optical transmitter and receiver unit and the like can be constructed.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 9(a)–FIG. 9(c), FIG. 10(a)–FIG. 10(d), and FIG. 11(a)–FIG. 11(c) are diagrams explanatory of a production process as a seventh embodiment of the invention;

FIG. 12(a)–FIG. 12(c), FIG. 13(a)–FIG. 13(f), and FIG. 14(a)–FIG. 14(c) are diagrams explanatory of a production process as an eighth embodiment of the invention;

FIG. 15 is a diagram explanatory of an optical subscriber system;

DESCRIPTION OF THE PREFERRED EMBODIMENTS

Embodiments of the invention will be described below with reference to the accompanying drawings.

(1) First Embodiment

Figure 1:
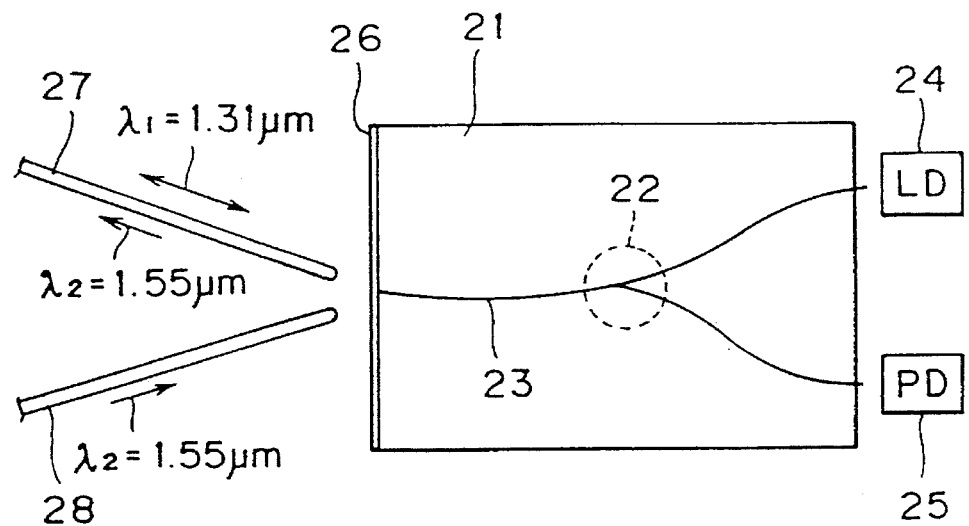
FIG. 1 is a diagram showing a structure of a first embodiment of the invention.

FIG. 1 is a diagram showing a structure of a waveguide type optical multiplexer and demultiplexer module of a first embodiment of the invention. Referring to FIG. 1, reference numeral 21 denotes a waveguide substrate. On the waveguide substrate 21, there are provided optical waveguides 23 so as to form an optical coupler (corresponding to the optical coupler 8 in FIG. 16) 22. On the end surface at the side opposite to the side at which a laser diode 24 and a photodiode 25 are disposed, where one end (input and output end) of the optical waveguide 23 appears on the surface, there is formed a multiplexing and demultiplexing filter film (dielectric multilayer film) 26. The multiplexing and demultiplexing filter film 26 is formed by alternately depositing SiO2 and TiO2 layers by evaporation and it has a property of transmitting a first wavelength (wavelength $\lambda_1=1.31$ μm) and reflecting a second wavelength (wavelength $\lambda_2=1.55$ μm).

Figure 16:
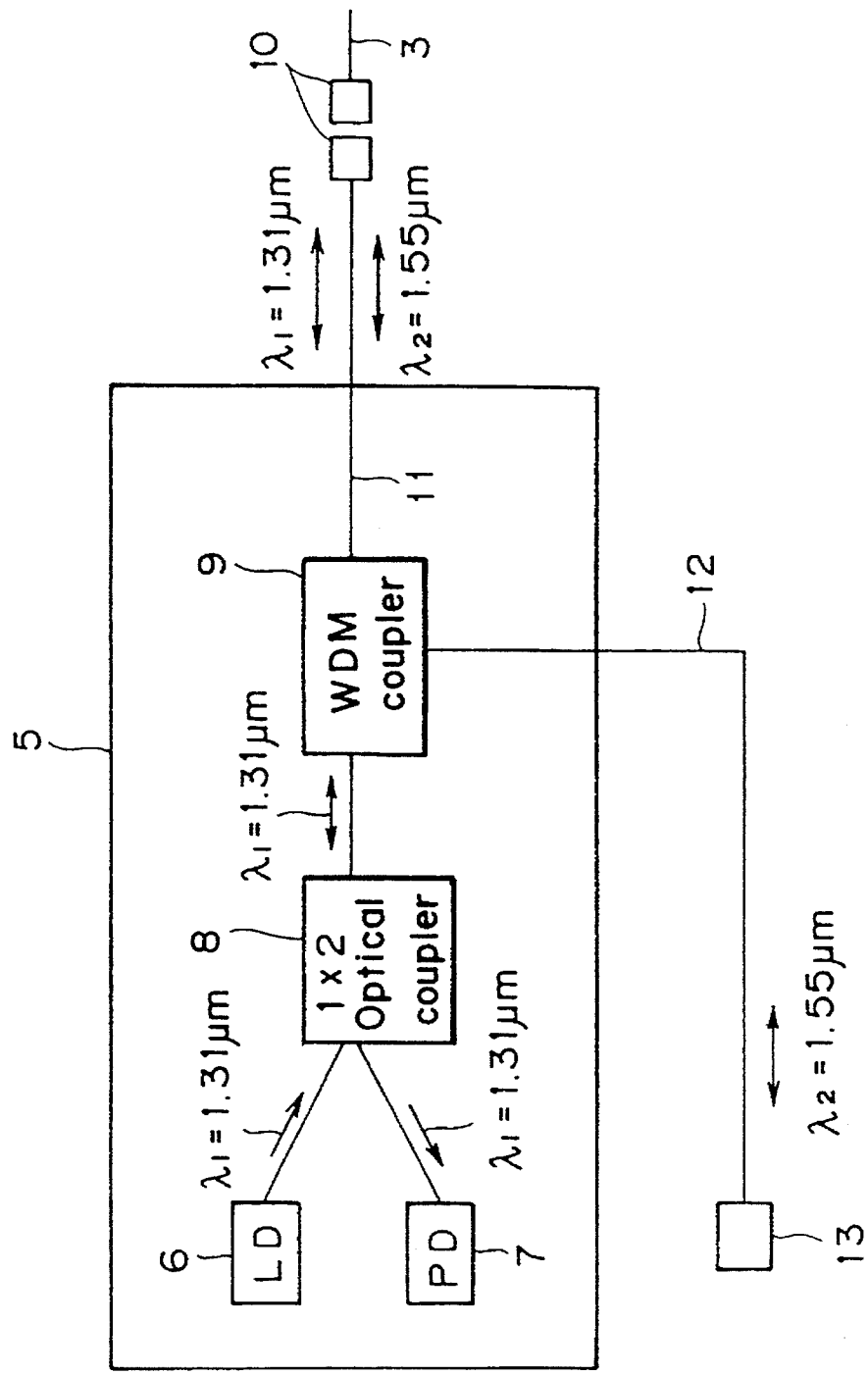
FIG. 16 is a diagram explanatory of a principal portion of an optical transmitter and receiver unit.
Figure 17:
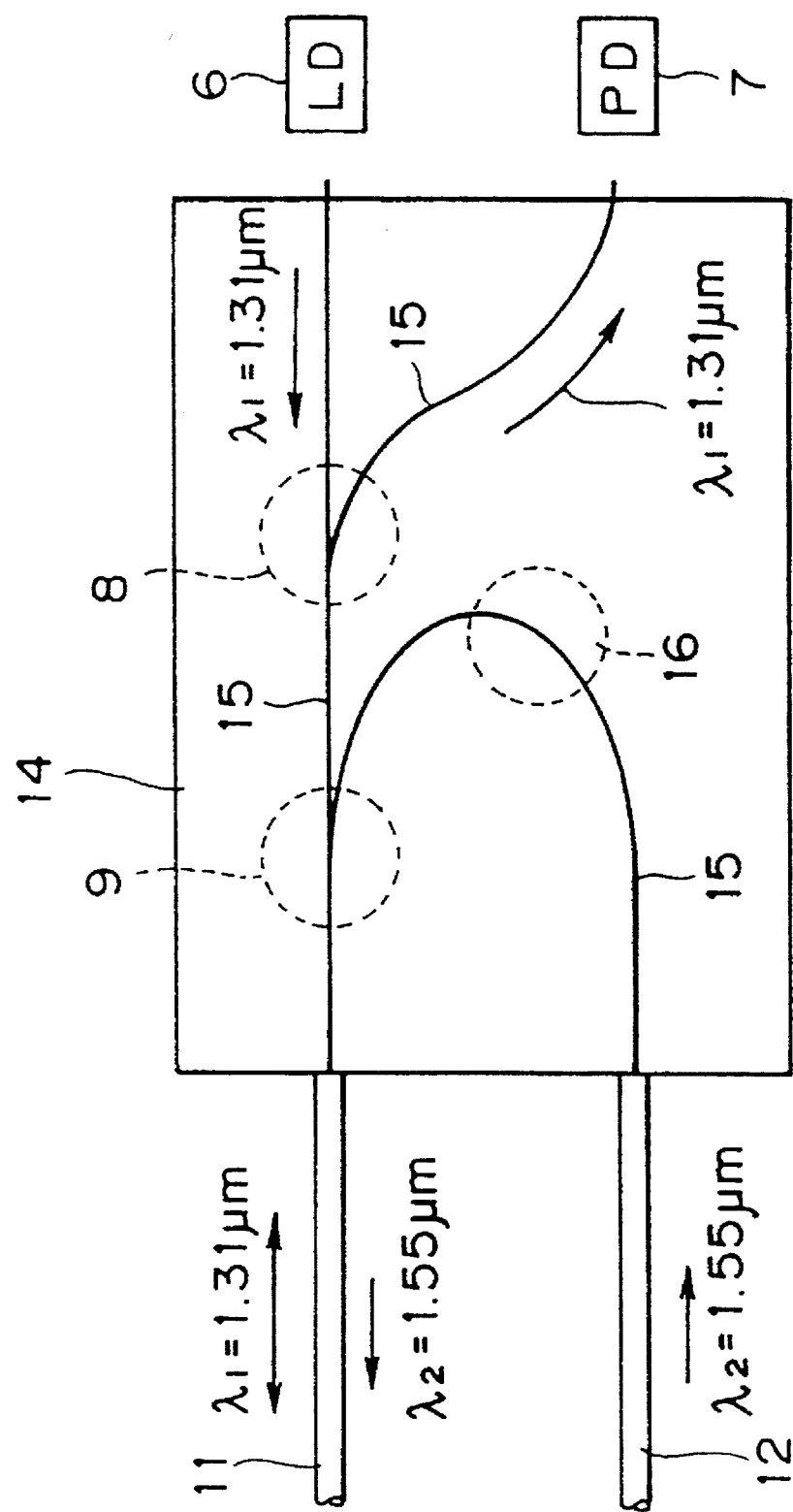
FIG. 17 is a diagram showing a structure of a conventional art.

Reference numeral 27 denotes a first optical fiber (corresponding to the first optical fiber 11 in FIG. 16) and 28 denotes a second optical fiber (corresponding to the second optical fiber 12 in FIG. 16). The first optical fiber 27 and the second optical fiber 28 are processed to have a spherical front, namely, the front end of each optical fiber is formed into a spherical shape so that use of a lens can be eliminated. The first optical fiber 27 is arranged so as to couple with the optical waveguide 23 on the waveguide substrate 21 through the multiplexing and demultiplexing filter film 26. The second optical fiber 28 is arranged so as to couple with the first optical fiber 27 through the multiplexing and demultiplexing filter film 26. Further, the first optical fiber 27 and the second optical fiber 28 are arranged such that their front ends are slightly apart from the multiplexing and demultiplexing filter film 26.

The optical signal from the first optical fiber 27 of wavelength λ1 is transmitted through the multiplexing and demultiplexing filter film 26 and introduced into the optical waveguide 23 from its input and output end and received by the photodiode 25 through the optical coupler 22, while an optical signal from the laser diode 24 of wavelength 21 is emitted from the input and output end of the optical waveguide 23 via the optical coupler 22 and transmitted through the multiplexing and demultiplexing filter film 26 to be sent to the first optical fiber 27. On the other hand, an optical signal from the second optical fiber 28 of wavelength $\lambda_2$ is reflected by the multiplexing and demultiplexing filter film 26 and sent to the first optical fiber 27. Namely, by the described arrangement of the multiplexing and demultiplexing filter film 26 and the first and second optical fibers 27 and 28, the function of the second optical coupler (WDM coupler) 9 in FIG. 16 can be performed.

According to the embodiment, the first and the second optical fibers 27 and 28 are coupled through the multiplexing and demultiplexing filter film 26 and, therefore, the hitherto required U shaped optical waveguide formed on the waveguide substrate has become unnecessary. Accordingly, the waveguide type optical multiplexer and demultiplexer module can be provided in a very compact size! . Further, since the first optical fiber 27 and the second optical fiber 28 are arranged at the same side of the waveguide substrate 21, the mountability of the module on an optical transmitting and receiving unit can be enhanced.

(2) Second Embodiment

Figure 2:
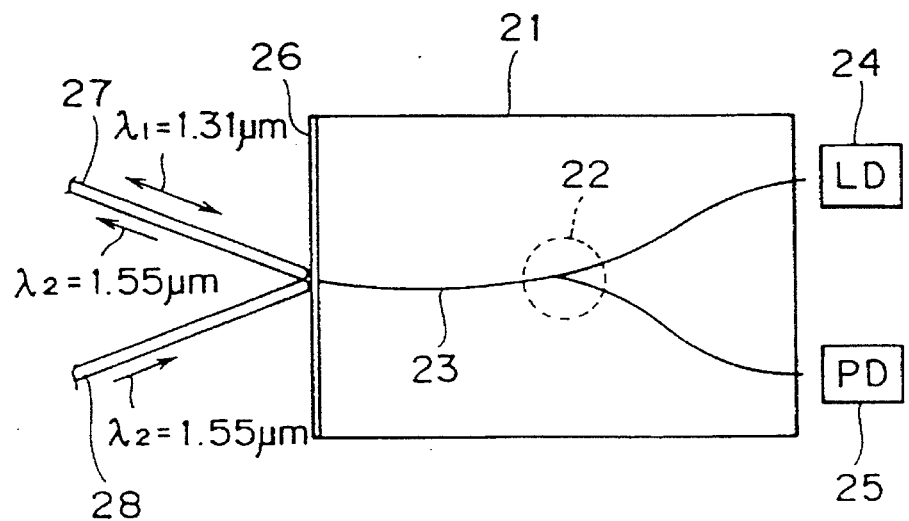
FIG. 2 is a diagram showing a structure of a second embodiment of the invention.

FIG. 2 is a diagram showing a structure of a waveguide type optical multiplexer and demultiplexer module of a second embodiment of the invention. Component parts in FIG. 2 virtually the same as those in FIG. 1 are denoted by corresponding reference numerals and therefore description of the same will be partly omitted. While the first optical fiber 27 and the second optical fiber 28 in the above described first embodiment were processed to have a spherical front end and the ends were arranged slightly apart from the multiplexing and demultiplexing filter film 26, the first optical fiber 27 and the second optical fiber 28 in the present embodiment have their end faces adhesively fixed to the multiplexing and demultiplexing filter film 26.

Figure 3:
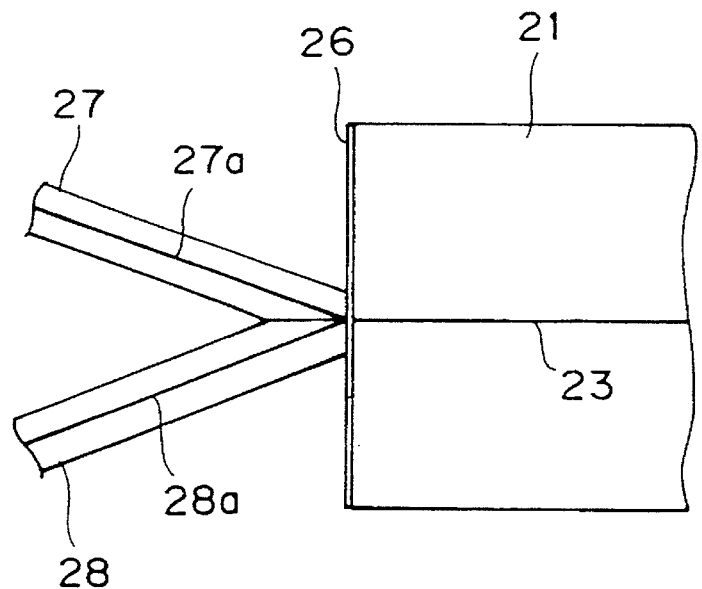
FIG. 3 is an enlarged view showing a principal portion of the second embodiment.

The portion at which the optical fibers are adhesively fixed to the filter film is shown in detail in FIG. 3. Namely, the front end portions of the first optical fiber 27 and the second optical fiber 28 are obliquely cut with the front end portions partly left uncut. The obliquely cut surfaces are stuck together such that cores 27a and 28a of the first optical fiber 27 and the second optical fiber 28 join to each other at the front end portions. Further, the front end faces of the first optical fiber 27 and the second optical fiber 28 are adhesively fixed to the multiplexing and demultiplexing filter film 26 such that the core 27a of the first optical fiber 27 couples with the input and output end of the optical waveguide 23. Structure and effects except those described above are the same as in the first embodiment.

Figure 4:
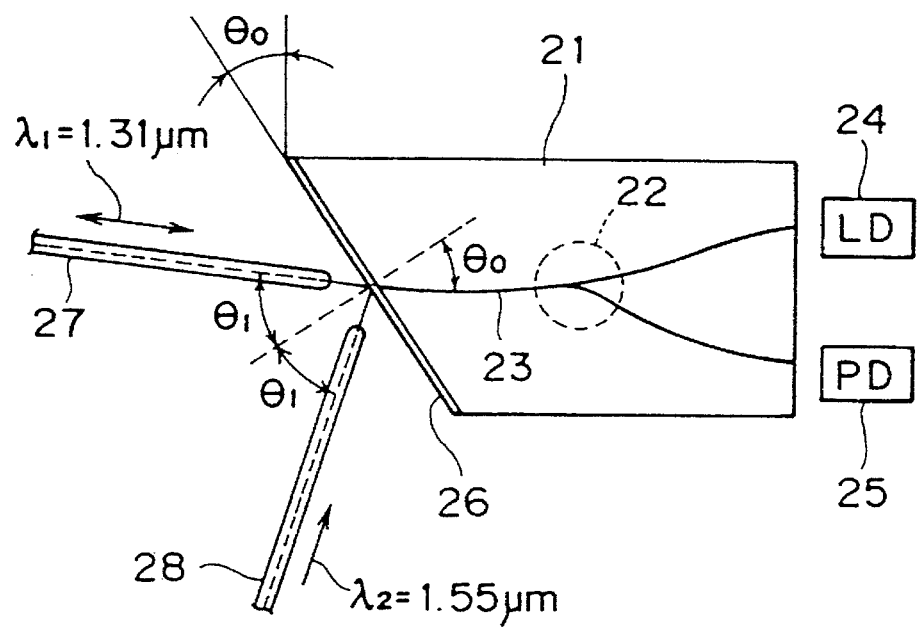
FIG. 4 is a diagram showing a structure of a third embodiment of the invention.

(3) Third Embodiment:

FIG. 4 is a diagram showing a structure of a waveguide type optical multiplexer and demultiplexer module of a third embodiment of the invention. Component parts in FIG. 4 virtually the same as those in FIG. 1 are denoted by corresponding reference numerals and therefore description of the same will be partly omitted. While the end surface of the waveguide substrate 21 at the side of the input and output end of the optical waveguide 23 in the above described first embodiment was virtually perpendicular to the optical waveguide 23 and the multiplexing and demultiplexing filter film 26 was formed on the end surface. In this embodiment, however, the end surface is formed such that the normal line thereto is at an angle of θ0 with a portion of the optical waveguide 23 which is in the vicinity of the input and output end thereof and the multiplexing and demultiplexing filter film 26 is formed on the end surface.

Meanwhile, the first optical fiber 27 and the second optical fiber 28 are arranged on both sides of the normal line to the end surface such that each thereof forms an angle θ1 with the normal line. The angle θ0 and the angle θ1 are set to satisfy the relationship expressed as $$\sin\theta 1 = n.\theta 0 \qquad (1)$$

where n is the refractive index of the optical waveguide 23.

By establishing such an positional relationship, the light power loss due to the fact that the first optical fiber 27 and the optical waveguide 23 are not straightly coupled can be kept down and, hence, a high optical coupling efficiency between the first optical fiber 27 and the optical waveguide 23 can be obtained. Structure and effects except those described above are the same as in the first embodiment.

(4) Fourth Embodiment

Figure 5:
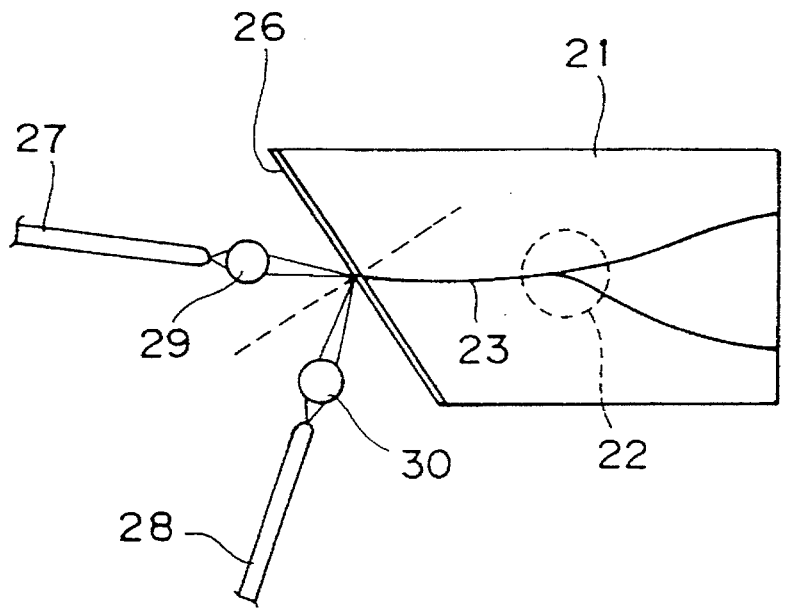
FIG. 5 is a diagram showing a structure of a fourth embodiment of the invention.

FIG. 5 is a diagram showing a structure of a waveguide type optical multiplexer and demultiplexer module of a fourth embodiment of the invention. Component parts in FIG. 5 virtually the same as those in FIG. 1 or FIG. 4 are denoted by corresponding reference numerals and therefore description of the same will be partly omitted. The first optical fiber 27 and the second optical fiber 28 in the above described first or third embodiment were processed to have spherical front ends. In this embodiment, however, the front end portions of the first optical fiber 27 and the second optical fiber 28 are ordinarily cut, i.e., perpendicularly to the core, and there are disposed a first lens 29 and a second lens 30 between the first and the second optical fibers 27 and 28 and the multiplexing and demultiplexing filter film 26, respectively.

The center axis of the first optical fiber 27 and the center axis of the first lens 29 are aligned and the center axis of the second optical fiber 28 and the center axis of the second lens 30 are also aligned. The first optical fiber 27 is coupled to the input and output end of the optical waveguide 23 through the first lens 29 and the second optical fiber 28 is coupled to the first optical fiber 27 through the second lens 30, the multiplexing and demultiplexing filter film 26, and the first lens 29. Structure and effects except those described above are the same as in the first embodiment.

(5) Fifth Embodiment

Figure 6:
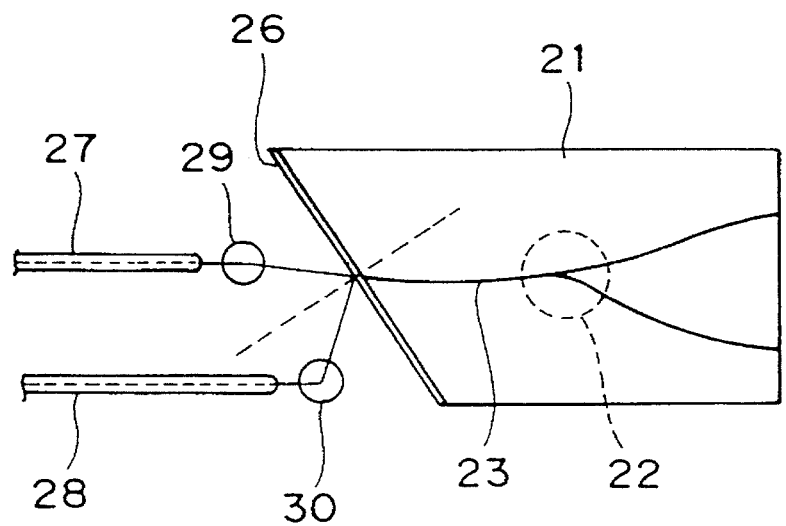
FIG. 6 is a diagram showing a structure of a fifth embodiment of the invention.

FIG. 6 is a diagram showing a structure of a waveguide type optical multiplexer and demultiplexer module of a fifth embodiment of the invention. Component parts in FIG. 6 virtually the same as those in FIG. 1 or FIG. 5 are denoted by corresponding reference numerals and therefore description of the same will be partly omitted. While the first optical fiber 27 and the second optical fiber 28 in the above described fourth embodiment were arranged to form a predetermined angle therebetween, it is desirable from the point of view of mountability of the waveguide type optical multiplexer and demultiplexer module that the first optical fiber 27 and the second optical fiber 28 are as parallel to each other as possible.

Accordingly, in this embodiment, the center axis of the first optical fiber 27 and the center axis of the first lens 29 are arranged to be out of alignment and the center axis of the second optical fiber 28 and the center axis of the second lens 30 are also arranged to be out of alignment. Thereby, while the first optical fiber 27 and the second optical fiber 28 are arranged virtually parallel to each other, the coupling of the first optical fiber 27 with the optical waveguide 23 and the coupling of the second optical fiber 28 with the first optical fiber 27 can be attained.

Figure 7:
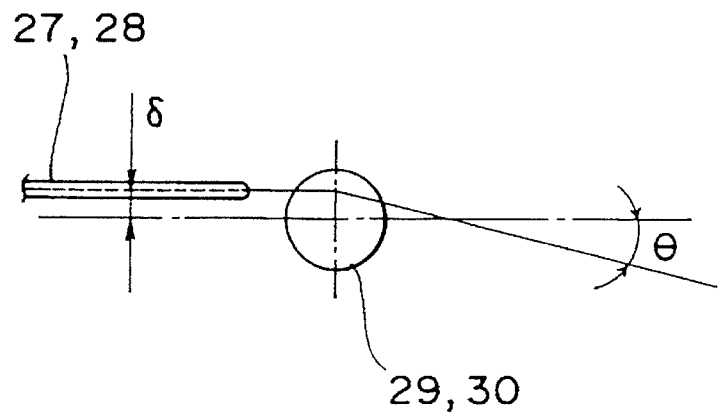
FIG. 7 is a diagram explanatory of the principle of a change in angle caused by axis offsetting.

By arranging the center axis of the optical fiber 27 or 28 and the center axis of the lens 29 or 30 to be out of alignment as shown in FIG. 7, the angle θ of the emitted light can be changed according to the amount of out of alignment, or offset δ. By utilizing the principle, it has been made possible to arrange the first and second optical fibers 27 and 28 to be parallel to each other and enhance the mountability of the waveguide type optical multiplexer and demultiplexer module. Structure and effects except those described above are the same as in the first embodiment.

(6) Sixth Embodiment

Figure 8:
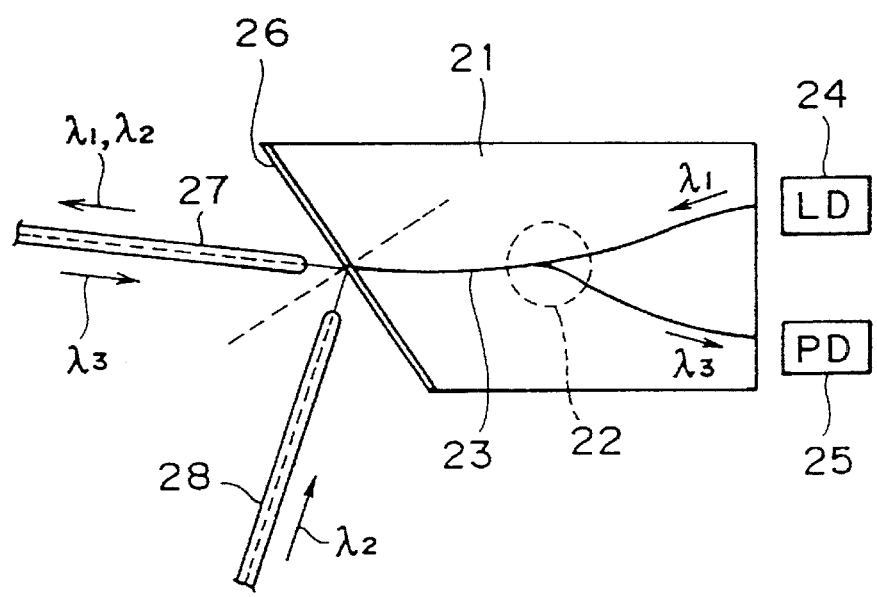
FIG. 8 is a diagram showing a structure of a sixth embodiment of the invention.

FIG. 8 is a diagram showing a structure of a waveguide type optical multiplexer and demultiplexer module of a sixth embodiment of the invention. Component parts in FIG. 8 virtually the same as those in FIG. 1 or FIG. 4 are denoted by corresponding reference numerals and therefore description of the same will be partly omitted. Although this embodiment is similar to the third embodiment in structure, it uses three wavelengths λ1, λ2, and λ3. It is designed so that an optical signal from the laser diode 24 of wavelength hi is sent to the first optical fiber 27, an optical signal from the first optical fiber 27 of wavelength λ3 is sent to the photodiode 25, and an optical signal from the second optical fiber 28 of wavelength λ2 is sent to the first optical fiber 27. The multiplexing and demultiplexing filter film 26 transmits the optical signals with the wavelength λ1 and the wavelength λ3 and reflects the optical signal with the wavelength λ2. Structure and effects except those described above are the same as in the first embodiment or the third embodiment.

(7) Seventh Embodiment

Figure 9:
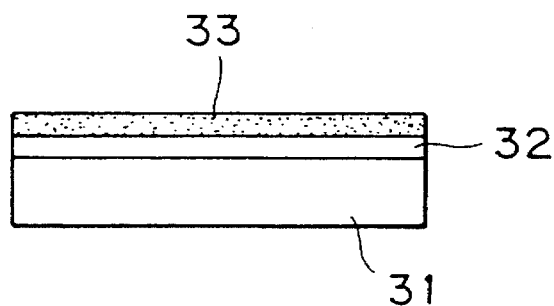
Figure 9:
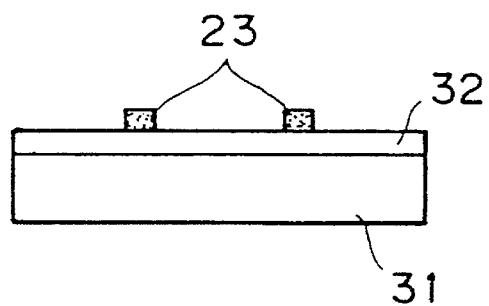
Figure 9:
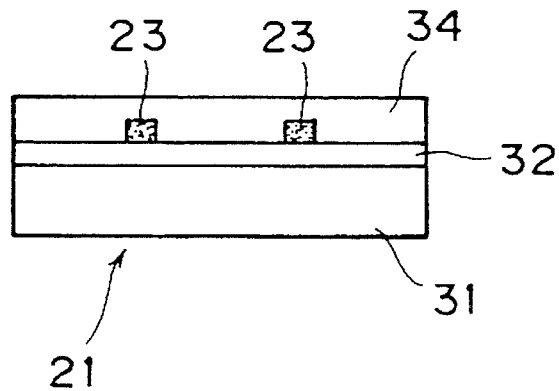
Figure 10:
Figure 10:
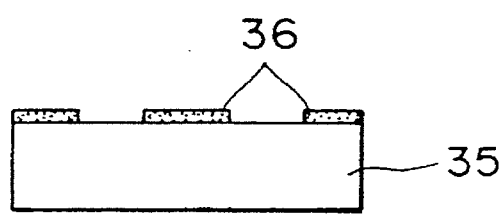
Figure 10:
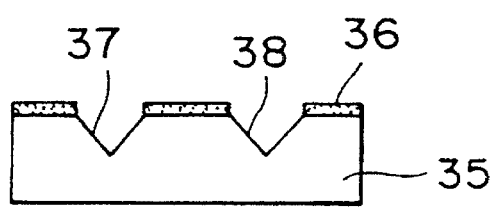
Figure 10:
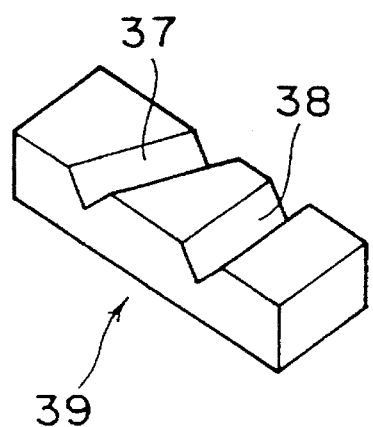
Figure 12:
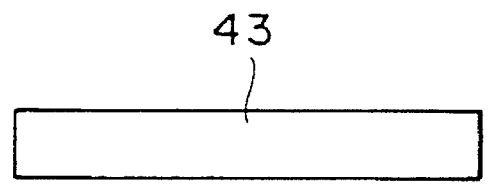
Figure 12:
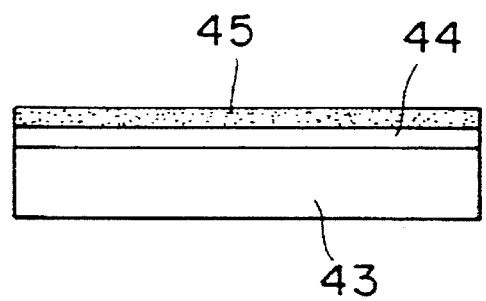
Figure 12:
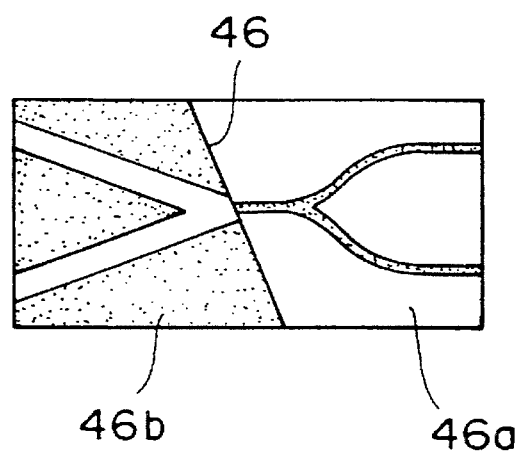

A production process of the waveguide type optical multiplexer and demultiplexer module, shown in the above first and third embodiments, as a seventh embodiment of the invention will be described below with reference to production process diagrams of FIG. 9 to FIG. 11. Component parts in FIGS. 9 to 11 virtually the same as those in FIG. 1 are denoted by corresponding reference numerals and therefore description of the same will be partly omitted.

FIG. 9(a) to FIG. 9(c) are diagrams showing a production process of a waveguide substrate. First, as shown in FIG. 9(a), a clad layer 32 whose refractive index is $n_2$ is uniformly formed on an Si substrate 31 and, over the same, a core layer 33 whose refractive index is $n_1$ ($n_1$>$n_2$) is uniformly formed. Then, as shown in FIG. 9(b), an etching process is performed with a mask placed on the portion at which the optical waveguide is to be formed. Then the mask is removed and, thereby, the optical waveguide 23 is formed. Then, as shown in FIG. 9(c), an over clad layer 34 is formed on the surface and, thereby, the waveguide substrate 21 of the form having its end surface at the side of the input and output end of the optical waveguide 23 obliquely cut as shown in FIG. 4 is produced.

On the end surface of the waveguide substrate 21 at the side of the input and output end of the optical waveguide 23, SiO2 and TiO2 layers are alternately deposited by evaporation, and thereby a multiplexing and demultiplexing filter film 26 having a property of transmitting a first wavelength (wavelength $\lambda_1$=1.31 μm) and reflecting a second wavelength (wavelength $\lambda_2$=1.55 μm) is formed.

FIG. 10(a) to FIG. 10(d) are diagrams showing a production process of a fiber fixing substrate (a first substrate) for arranging the first optical fiber 27 and the second optical fiber 28 in a predetermined angular relationship. On an Si substrate 35 shown in FIG. 10(a), a predetermined mask is formed as shown in FIG. 10(b). The mask 36 is formed on the portion excepting the portion where the first optical fiber 27 and the second optical fiber 28 are to be arranged.

Then, an anisotropic etching process (solvent: KOH) is performed so that a pair of V grooves 37 and 38 are formed in the Si substrate 35 as shown in FIG. 10(c). Then, Au films are formed on the surfaces of the V grooves 37 and 38 by plating, and thereby a fiber fixing substrate 39 having a pair of grooves 37 and 38 formed therein in a predetermined angular relationship as shown in FIG. 10(d) is produced. The fixing of the first optical fiber 27 and the second optical fiber 28 to the fiber fixing substrate 39 is performed in the following manner.

The fixing will be described with reference to FIG. 11(a) to FIG. 11(c). Au films 40 are formed by plating around the front end portions of the first optical fiber 27 and the second optical fiber 28, and then the first optical fiber 27 and the second optical fiber 28 are placed along their respective V grooves 37 and 38 in the fiber fixing substrate 39 and adhesively fixed to the grooves by solder 41. Thus, the first optical fiber 27 and the second optical fiber 28 are fixed on the fiber fixing substrate 39 in the predetermined relative positions. The waveguide substrate 21 produced through the above described process and the fiber fixing substrate 39, on which the first and second optical fibers 27 and 28 are fixed in the predetermined relative positions, are fixed on a module substrate (a second substrate) 42, with a predetermined positional relationship kept therebetween, by soldering or the like, and thus the waveguide type optical multiplexer and demultiplexer module is produced.

Since the first optical fiber 27 and the second optical fiber 28 can be arranged in the predetermined relative positions only by being fixed along the V grooves 37 and 38 formed in the fiber fixing substrate 39, the adjustment required is only adjustment of the positional relationship between the fiber fixing substrate 39 and the waveguide substrate 21. Therefore, the adjusting work is simple. The fixing of the first optical fiber 27 and the second optical fiber 28 to the fiber fixing substrate 39, the fixing of the fiber fixing substrate 39 to the module substrate 42, or the fixing of the waveguide substrate 21 to the module substrate 42 may be done by using an adhesive.

(8) Eighth Embodiment

FIG. 12(a) to FIG. 14(c) are diagrams showing a production process of a waveguide type optical multiplexer and demultiplexer module as an eighth embodiment of the invention. In these figures, parts substantially the same as those in FIG. 1 are denoted by corresponding reference numerals and description of the same will be partly omitted. In the above described seventh embodiment, the waveguide substrate 21 and the fiber fixing substrate 39 were independently fabricated and then they were mounted on the module substrate 42. In the present embodiment, however, the waveguide substrate 21 and the fiber fixing substrate 39 are integrally structured.

The production process will now be described. On an Si substrate 43 as shown in FIG. 12(a), a clad layer 44 whose refractive index is $n_2$ is uniformly formed as shown in FIG. 12(b), and over the same, a core layer 45 whose refractive index is $n_1$ ($n_1$>$n_2$) is uniformly formed. Then, the area on the Si substrate 43 is divided in two, a fist area 46a and a second area 46b, by a predetermined line 46 as shown in FIG. 12(c). Then, the portion of the first area 46a which becomes the optical waveguide 23 is masked and, further, the portion of the second area 46b except the portion where the first and second optical fibers 27 and 28 are to be fixed is masked. Then, etching is performed on the substrate and the optical waveguide 23 is formed as shown in FIG. 13(a) to FIG. 13(c).

Figure 14A:
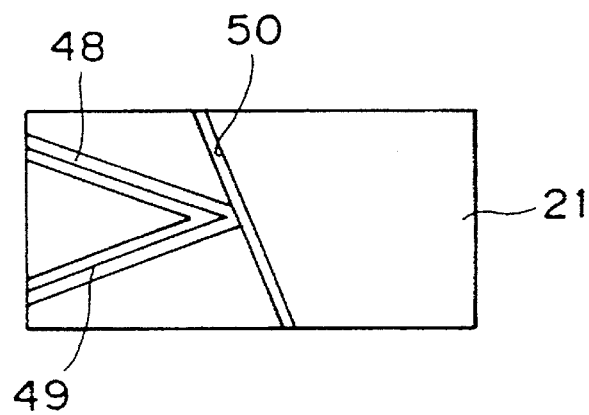
Figure 14B:
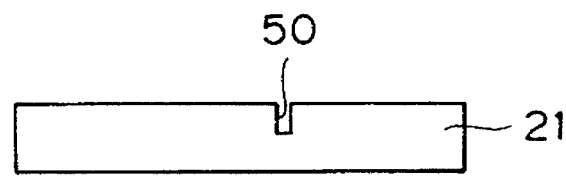

Thereafter, as shown in FIG. 13(d), an overclad layer 47 is formed on the first area 46a. Then, by performing anisotropic etching, a pair of V grooves 48 and 49 in a predetermined positional relationship are formed in the second area 46b as shown in FIG. 13(e) and FIG. 13(f) and an Au film is formed by plating on the pair of V grooves 48 and 49. Then, a slit (groove) 50 with a predetermined width is formed along the line 46 dividing the first area 46a and the second area 46b as shown in FIG. 14(a) and FIG. 14(b). Further, on the surface of the slit 50 at the side of the optical waveguide 23, the multiplexing and demultiplexing filter film 26 having a property of transmitting a first wavelength (wavelength $\lambda_1 = 1.31$ μm) and reflecting a second wavelength (wavelength $\lambda_2 = 1.55$ μm) is formed by alternately depositing thereon an SiO2 layer and a TiO2 layer by evaporation or the like.

Figure 14C:
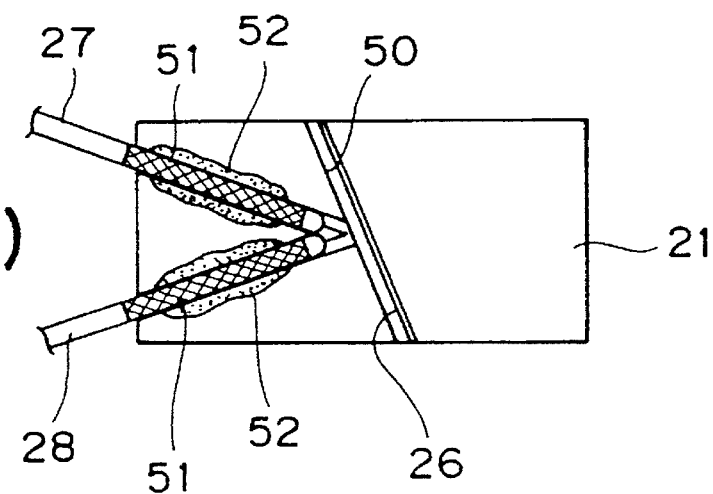

Thereafter, as shown in FIG. 14(c), Au films 51 are formed around the front end portions of the first optical fiber 27 and the second optical fiber 28, the first optical fiber 27 and the second optical fiber 28 are placed along their respective V grooves 48 and 49 formed in the waveguide substrate 21 and secured to the grooves by solder 52. Thereby, the waveguide type optical multiplexer and demultiplexer module is produced.

In the eighth embodiment, different from the above described seventh embodiment, the fiber fixing substrate 39 and the module substrate 42 are not required. Therefore, miniaturization and cost reduction of the waveguide type optical multiplexer and demultiplexer module can be attained. The first optical fiber 27 (the V groove 48), the second optical fiber 28 (the V groove 49), the optical waveguide 23, and the multiplexing and demultiplexing filter film 26 are placed in the predetermined relative positions as described in the fourth embodiment. Fixing of the first optical fiber 27 and the second optical fiber 28 to the waveguide substrate 21 may be achieved by using an adhesive. Structure and effects except those described above are the same as in the first embodiment.

Since the present invention has been structured as described above in detail, such merits can be obtained that miniaturization of the waveguide type optical multiplexer and demultiplexer module can be attained while the mountability of it on optical transmitter and receiver units and the like is not impaired. Accordingly, large scale integration and cost reduction of optical transmitter and receiver units and the like to which the waveguide type optical multiplexer and demultiplexer module is used can be attained.

What is claimed is:

1. An optical multiplexer and demultiplexer module comprising:

a waveguide substrate on which a waveguide is formed;

a multiplexing and demultiplexing filter film provided on an end surface of said waveguide substrate, on which surface an input and output end of said optical waveguide appears, for transmitting a first wavelength and reflecting a second wavelength;

a first optical fiber arranged such that a light beam with said first wavelength propagated therethrough is coupled to said optical waveguide on said waveguide substrate after being transmitted through said multiplexing and demultiplexing filter film; and a second optical fiber arranged such that a light beam with said second wavelength propagated therethrough is coupled to said first optical fiber after being reflected by said multiplexing and demultiplexing filter film.

2. An optical multiplexer and demultiplexer module according to claim 1, wherein said first optical fiber and said second optical fiber have their front ends shaped into a spherical form and are arranged slightly apart from said multiplexing and demultiplexing filter film.

3. An optical multiplexer and demultiplexer module according to claim 1, wherein end faces of said first optical fiber and said second optical fiber are adhesively attached to said multiplexing and demultiplexing filter film.

4. An optical multiplexer and demultiplexer module according to claim 3, wherein said first optical fiber and said second optical fiber are obliquely cut in the vicinity of their front end faces such that said front end faces are partly left uncut and said obliquely cut faces are joined together, whereby front ends of the cores of said first optical fiber and said second optical fiber are joined together.

5. An optical multiplexer and demultiplexer module according to claim 1, wherein the end surface, on which said multiplexing and demultiplexing filter film is formed, of said waveguide substrate is oriented such that the normal line to said end surface forms an angle of $\theta_0$ with said optical waveguide, said first optical fiber and said second optical fiber are arranged on both sides of the normal line to said end surface, each forming an angle of $\theta_1$ with the normal line, and said angle $\theta_0$ and said angle $\theta_1$ are set so as to substantially satisfy the relationship $$\sin\theta_1 = n \cdot \sin\theta_0,$$

where n is the refractive index of said optical waveguide.

6. An optical multiplexer and demultiplexer module according to claim 1, wherein said first optical fiber is coupled to said optical waveguide through a first lens, and said second optical fiber is coupled to said first optical fiber through a second lens.

7. An optical multiplexer and demultiplexer module according to claim 6, wherein said first optical fiber and the center axis of said first lens are arranged to be out of alignment, and said second optical fiber and the center axis of said second lens are arranged to be out of alignment, whereby said first optical fiber and said second optical fiber are arranged substantially parallel to each other.

8. An optical multiplexer and demultiplexer module according to claim 5, further comprising:

a first substrate in which a pair of V grooves are formed, said V grooves forming the same angle therebetween as the angle to be formed between said first optical fiber and said second optical fiber; and a second substrate on which said first substrate and said waveguide substrate are to be fixed, wherein said first optical fiber and said second optical fiber are disposed along their respective V grooves and then fixed to said first substrate, and said first substrate and said waveguide substrate are disposed so as to satisfy said predetermined relationship and then fixed to said second substrate.

9. An optical multiplexer and demultiplexer module according to claim 8, wherein the surfaces around the front end portions of said first optical fiber and said second optical fiber and the surfaces of said V grooves are coated with metallic plating, and said first optical fiber and said second optical fiber are fixed at their metal-plated portions to said V grooves formed in said first substrate by soldering.

10. An optical multiplexer and demultiplexer module according to claim 8, wherein said first substrate and said waveguide substrate are fixed to said second substrate by soldering.

11. An optical multiplexer and demultiplexer module comprising:

a waveguide substrate, on which an optical waveguide is formed, having a slit formed therein such that the input and output end of said optical waveguide appears on a surface of said slit and having a first V groove and a second V groove formed therein so as to form predetermined angles with said slit;

a multiplexing and demultiplexing filter film provided on the surface of said slit formed in said waveguide substrate, on which surface said optical waveguide appears, for transmitting a first wavelength and reflecting a second wavelength;

a first optical fiber arranged along and fixed to said first V groove such that a light beam with said first wavelength propagated therethrough is coupled to said optical waveguide on said waveguide substrate after being transmitted through said multiplexing and demultiplexing filter film; and a second optical fiber arranged along and fixed to said second V groove such that a light beam with said second wavelength propagated therethrough is coupled to said first optical fiber after being reflected by said multiplexing and demultiplexing filter film.

12. an optical multiplexer and demultiplexer module according to claim 11, wherein said slit is formed such that the normal line thereof forms an angle of $\theta_0$ with said optical waveguide, said first V groove and said second V groove are arranged on both sides of the normal line to said slit, each forming an angle of $\theta_1$ with the normal line, and said angle $\theta_0$ and said angle $\theta_1$ are set so as to substantially satisfy the relationship $$\sin\theta_1 = n.\sin\theta_0,$$

where n is the refractive index of said optical waveguide.

13. An optical multiplexer and demultiplexer module according to claim 11, wherein the surfaces around the front end portions of said first optical fiber and said second optical fiber and the surfaces of said first V groove and said second V groove are coated by metallic plating, and said first optical fiber and said second optical fiber are arranged along said first V groove and said second V groove and are fixed at their metal plated portions to said waveguide substrate by soldering.

* * * * *